(12) United States Patent
Uhrich et al.

(10) Patent No.: US 10,087,803 B2
(45) Date of Patent: Oct. 2, 2018

(54) METHOD AND SYSTEM FOR AN EXHAUST CATALYST

(71) Applicant: Ford Global Technologies, LLC, Dearborn, MI (US)

(72) Inventors: Michael James Uhrich, West Bloomfield, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 15/228,538

(22) Filed: Aug. 4, 2016

(65) Prior Publication Data

US 2018/0038257 A1   Feb. 8, 2018

(51) Int. Cl.
  *F01N 3/00*  (2006.01)
  *F01N 3/20*  (2006.01)
  *F01N 5/02*  (2006.01)

(52) U.S. Cl.
  CPC .......... *F01N 3/2053* (2013.01); *F01N 3/005* (2013.01); *F01N 5/02* (2013.01); *F01N 2260/02* (2013.01); *F01N 2390/00* (2013.01)

(58) Field of Classification Search
  USPC ......... 60/274, 286, 287, 288, 289, 295, 297, 60/298, 320
  See application file for complete search history.

(56) References Cited

U.S. PATENT DOCUMENTS

| | | | |
|---|---|---|---|
| 5,377,486 A | 1/1995 | Servati et al. | |
| 5,560,201 A * | 10/1996 | Fujishita | F01N 3/0814 60/279 |
| 6,141,961 A | 11/2000 | Rinckel | |
| 6,178,743 B1 * | 1/2001 | Hirota | B01D 53/9495 60/277 |
| 6,253,547 B1 * | 7/2001 | Watanabe | B01D 53/9495 60/274 |
| 6,799,420 B2 * | 10/2004 | Ueno | B01D 53/0454 60/274 |
| 7,594,391 B2 | 9/2009 | I et al. | |
| 7,735,314 B2 * | 6/2010 | Lu | F01N 13/009 60/287 |
| 8,468,805 B2 * | 6/2013 | Wakao | F01N 3/0814 60/286 |

(Continued)

OTHER PUBLICATIONS

Uhrich, Michael James, et al., "Method and System for Exhaust Gas Heat Recovery," U.S. Appl. No. 15/010,382, filed Jan. 29, 2016, 70 pages.

(Continued)

*Primary Examiner* — Binh Q Tran
(74) *Attorney, Agent, or Firm* — Julia Voutyras McCoy Russell LLP (57) ABSTRACT

Methods and systems are provided for operating an engine exhaust aftertreatment system to increase the efficiency of an exhaust underbody catalyst and reduce engine emissions. In one example, a bypass passage may be coupled to a main exhaust passage and during conditions which may adversely affect functionality of the underbody catalyst, exhaust may be opportunistically routed via the bypass passage avoiding the underbody catalyst. Exhaust heat may be recovered via a heat exchanger coupled to the bypass passage, and the heat may be used for engine heating, and passenger cabin heating.

19 Claims, 5 Drawing Sheets

(56) References Cited

U.S. PATENT DOCUMENTS 8,516,801 B2 * 8/2013 Sano .................. B01D 53/9495
60/287

OTHER PUBLICATIONS

Uhrich, Michael James, et al., "Method and System for Exhaust Gas Heat Recovery," U.S. Appl. No. 15/010,537, filed Jan. 29, 2016, 72 pages.
Uhrich, Michael James, et al., "Exhaust Heat Recovery and Hydrocarbon Trapping," U.S. Appl. No. 15/010,688, filed Jan. 29, 2016, 53 pages.

* cited by examiner

| Catalyst bypass system mode | Diverter valve position | Underbody Catalyst bypassed | Engine operating conditions |
|---|---|---|---|
| 1 | 1st | No | Lower than threshold risk of condensation at underbody catalyst, higher than threshold AM, higher than first threshold exhaust temperature, lower than second threshold exhaust temperature |
| 2 | 2nd | Yes | Higher than threshold risk of condensation at underbody catalyst, lower than first threshold exhaust temperature, higher than second threshold exhaust temperature, DFSO |

FIG. 5

METHOD AND SYSTEM FOR AN EXHAUST CATALYST

FIELD

The present description relates generally to methods and systems for controlling a vehicle engine to increase efficiency of an exhaust aftertreatment system and reduce engine emissions.

BACKGROUND/SUMMARY

Emission control devices, such as an underbody catalyst, coupled to an exhaust passage of an internal combustion engine reduce combustion by-products such as oxides of nitrogen, carbon monoxide, and hydrocarbons. Engine cold-start emissions generated before light-off of the underbody catalyst may contribute to a significant percentage of the total exhaust emissions. Efficiency of the underbody catalyst may be affected by exhaust temperature, and may be suboptimal outside a specific temperature range. Also, functionality of the catalyst may be adversely affected by a higher than threshold oxygen loading in the catalyst.

Accordingly, various approaches have been developed for selectively routing exhaust through an exhaust catalyst based on exhaust temperature. One example approach, shown by Servati et al. in U.S. Pat. No. 5,377,486 involves, during cold-start conditions, routing exhaust first through a smaller catalyst before routing the exhaust through the underbody (main) catalyst, and after attainment of light-off temperature of the main catalyst, bypassing the smaller catalyst, and routing exhaust directly through the main catalyst. The smaller catalyst may attain light-off earlier than the main catalyst and by flowing exhaust first through the smaller catalyst, emissions quality may be increased. By bypassing the smaller catalyst after attainment of light-off temperature of the main catalyst, any damage to the smaller catalyst caused by a higher than threshold exhaust temperature may be reduced.

However, the inventors herein have recognized potential issues with such a system. As one example, due to the configuration of the system, irrespective of the exhaust temperature, the main catalyst is not bypassed. As such, owing to a coating on the underbody catalyst surface, the catalyst may have higher conversion efficiencies in a defined exhaust temperature range. As a result, at exhaust temperatures that are lower than or higher than the defined range, the functionality of the underbody catalyst may be reduced. In addition, the flow of hot exhaust may cause damage to catalyst components. As another example, as exhaust flows through the catalyst during cold-start conditions, water from exhaust components upstream of the main catalyst may condense on the catalyst and extract energy from the catalyst for evaporation, which may further affect catalyst functionality, and delay the attainment of light-off temperature. Further, during engine operating conditions such as a deceleration fuel shut off (DFSO), the engine may be operated un-fueled with air still being pumped through the cylinders. As a result, a higher concentration of oxygen may reach the catalyst causing oxygen saturation of the underbody catalyst. The oxygen saturation may result in reduction in the catalyst's ability to convert NOx adsorbed on the catalyst, thereby affecting emissions quality.

The inventors herein have identified an approach by which the issues described above may be at least partly addressed. In one example, the issues described above may be addressed by a method for an engine, comprising: during engine non-fueling conditions, flowing exhaust through a bypass passage while bypassing an exhaust underbody catalyst positioned in a main exhaust main passage, via a valve positioned downstream of the catalyst; and during engine fueling conditions, selectively flowing exhaust through the bypass passage based on each of a temperature and water content of the exhaust. In this way, by opportunistically bypassing the underbody catalyst during conditions which may adversely affect functionality of the catalyst, emissions quality may be improved.

In one example, the exhaust system may include a front catalyst and a main underbody catalyst coupled to the main exhaust passage downstream of the exhaust manifold. A bypass passage may be coupled to the main exhaust passage, parallel to the underbody catalyst, the bypass including a diverter. After flowing through the front catalyst, exhaust may either flow through the underbody catalyst, or flow through the bypass passage, bypassing the underbody catalyst. Routing of exhaust through the main passage or the bypass passage may be regulated via adjustments to a position of the diverter valve. For example, during cold-start conditions, the diverter valve may be adjusted so that exhaust may first bypass the underbody catalyst until water present in the exhaust flow has evaporated, and then the diverter valve may be readjusted so that exhaust may be routed through the underbody catalyst. Heat from the exhaust may be used to heat the underbody catalyst and attain the light-off temperature. In comparison, exhaust may be routed through the underbody catalyst during higher cylinder air mass conditions, as well as higher exhaust temperature conditions. In one example, during cooler exhaust temperature conditions, the exhaust may be routed to bypass the underbody catalyst in order to maintain operating temperature of the underbody catalyst above a desired operating temperature, as well as to reduce water in the exhaust from lowering the catalyst temperature. Similarly, during hotter exhaust temperature conditions, exhaust may be routed to bypass the underbody catalyst to reduce over-heating the catalyst. Also during engine operating conditions such as a DFSO, when there is a possibility of oxygen saturation at the underbody catalyst, exhaust may be routed to bypass the underbody catalyst. Further, a heat exchanger may be coupled to the bypass passage to transfer heat from exhaust flowing through the bypass passage to a coolant circulating through the heat exchanger. The heat recovered at the heat exchanger may be used for providing heat to vehicle components such as a cylinder head, and a passenger cabin.

In this way, by selectively bypassing an exhaust underbody catalyst immediately after an engine cold-start, water condensation and subsequent evaporation at the underbody catalyst may be reduced, thereby decreasing energy dissipation at the catalyst. As a result, delays in catalyst light-off caused by water condensation-evaporation cycles are reduced. In addition, unwanted drops in catalyst temperature from exhaust condensate are reduced. The technical effect of effectively using exhaust heat to expedite water evaporation from the underbody catalyst and increase catalyst temperature is that catalyst light-off is expedited, reducing the use of spark retard for catalyst heating, and increasing fuel economy. The technical effect of bypassing the underbody catalyst during conditions (such as lower than threshold exhaust temperatures and DFSO events) where the catalyst operating temperature may decrease, and/or where oxygen saturation of the catalyst can occur, is that catalyst efficiency may be maintained above a threshold level. By using a heat exchanger in the bypass passage to recover heat from the exhaust, exhaust heat may be effectively used for expedited engine warm-up, and for providing heat to the passenger cabin, thereby reducing the parasitic losses of engine power. Overall, by regulating the flow of exhaust through the exhaust catalyst, and a bypass passage housing a heat exchanger, emissions quality and fuel efficiency may be improved in an engine system.

DETAILED DESCRIPTION

Figure 1:
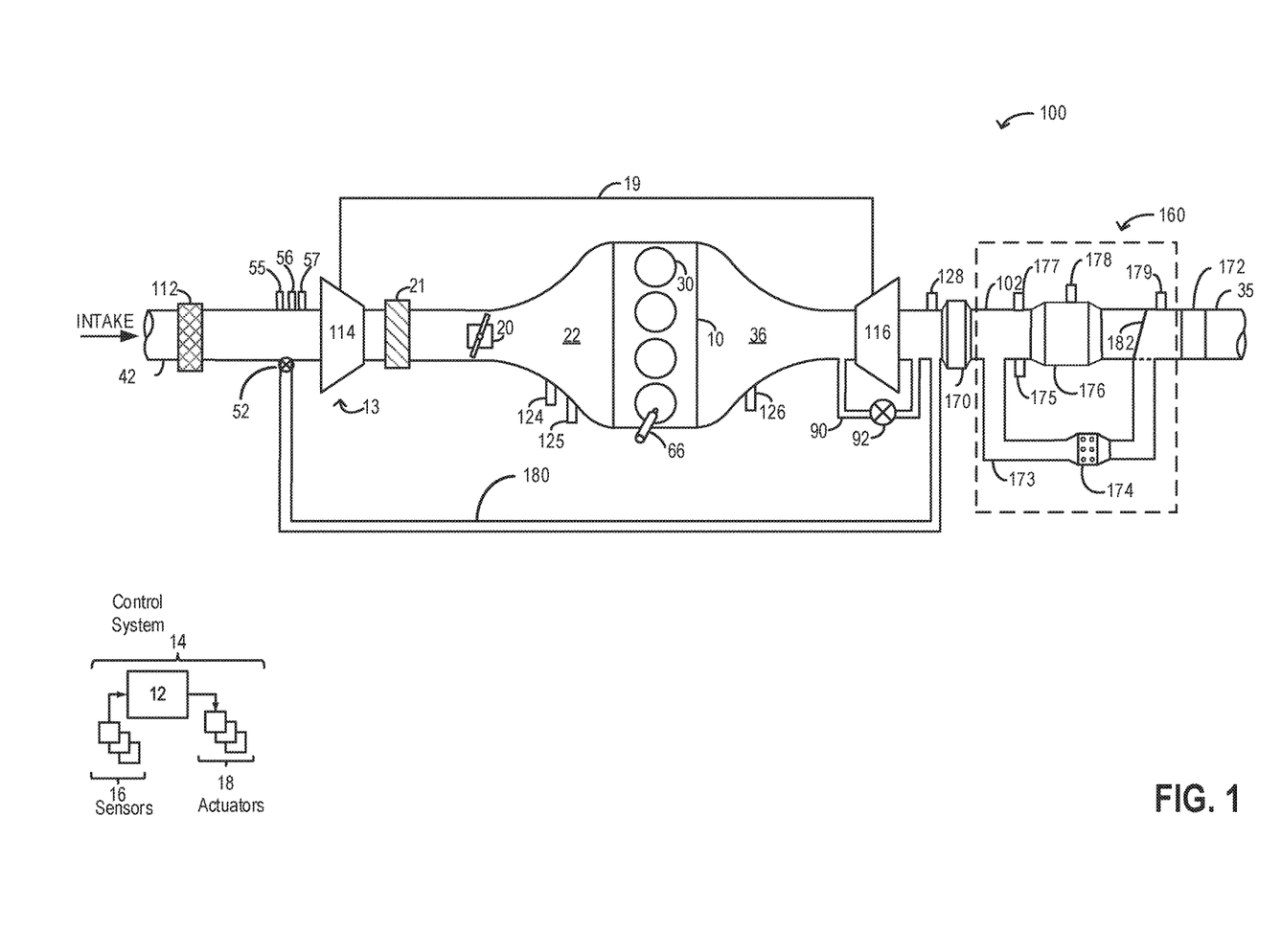
FIG. 1 shows an example embodiment of an engine system including an exhaust catalyst system.

The following description relates to systems and methods for increasing efficiency of an exhaust catalyst system and reducing engine emissions. An example engine system comprising an exhaust catalyst system with a bypass passage housing a heat exchanger is shown in FIG. 1. The different modes of operation of the exhaust catalyst system of FIG. 1 are elaborated with reference to FIGS. 2A and 2B. An engine controller may be configured to perform a control routine, such as the example routine of FIG. 3, to vary the position of a diverter valve coupled to the main exhaust passage to adjust exhaust flow through the exhaust catalyst system in the system of FIG. 1. The different modes of operation of the exhaust catalyst system are tabulated in FIG. 4. An example operation of the exhaust catalyst system of FIG. 1 is shown with reference to FIG. 5.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 21 to throttle valve 20. Throttle valve 20 is coupled to engine intake manifold 22. From the compressor, the compressed air charge flows through the charge-air cooler 21 and the throttle valve to the intake manifold. In the embodiment shown in FIG. 1, the pressure of the air charge within the intake manifold is sensed by manifold air pressure (MAP) sensor 124. Mass air-flow within the intake manifold is sensed by a manifold air flow (MAF) sensor 125. A cylinder air mass may be estimated based on inputs of each of the MAP sensor 124 and the MAF sensor 125.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate may then flow through a front catalyst 170 housed in the main exhaust passage 102. In general, the front catalyst 170 may include one or more exhaust after-treatment catalysts configured to catalytically treat the exhaust flow, and thereby reduce an amount of one or more substances in the exhaust flow.

All or part of the exhaust exiting from front catalyst 170 may then flow via an underbody catalyst 176 coupled to the main exhaust passage, downstream of the front catalyst 170. The underbody catalyst 176 may be configured to trap $NO_x$ from the exhaust flow when the exhaust flow is lean, and to reduce the trapped $NO_x$ when the exhaust flow is rich. In other examples, the underbody catalyst 176 may be configured to disproportionate $NO_x$ or to selectively reduce $NO_x$ with the aid of a reducing agent. In still other examples, underbody catalyst 176 may be configured to oxidize residual hydrocarbons and/or carbon monoxide in the exhaust flow. Different exhaust after-treatment catalysts having any such functionality may be arranged in wash coats or elsewhere in the underbody catalyst 176.

Efficiency of the underbody catalyst 176 may be affected by exhaust temperature, and may be sub-optimal outside a specific temperature range. For example, during a cold-start condition, where the exhaust flowing through the catalyst is not hot enough, the underbody catalyst 176 may not be activated fast enough. As a result, the catalyst may not operate optimally until the temperature of the catalyst has been increased to the light-off temperature. As exhaust flows through the underbody catalyst 176 during cold-start conditions, water from exhaust components upstream of the underbody catalyst 176 may condense on the catalyst and extract energy from the catalyst for evaporation, further affecting catalyst functionality, and further delaying the attainment of light-off temperature. As such, the exhaust water content may be affected by various engine operating conditions, such as exhaust temperature, EGR level, ambient conditions, etc. For example, due to one or more of a lower than threshold exhaust temperature, a higher than threshold ambient humidity, underbody catalyst brick temperature relative to exhaust temperature, and EGR flow and composition, there may be an elevated risk of water condensation at the underbody catalyst, which may adversely affect catalyst efficiency. A higher than an upper threshold exhaust temperature may also reduce catalyst functionality. Further, functionality of the catalyst may be adversely affected by a higher than threshold oxygen loading of the catalyst, such as during a deceleration fuel shut-off event (DFSO) when the engine is operated un-fueled while the valves keep working to pump air through the catalyst. As elaborated herein, during engine operating conditions when the functionality of the underbody catalyst 176 may be adversely affected due to one or more of a risk of water condensation at the underbody catalyst, exhaust temperature, and/or oxygen content, exhaust flow through the underbody catalyst may be bypassed.

Specifically, the exhaust catalyst system 160 may comprise a bypass passage 173 coupled to the main exhaust passage 102. The bypass passage 173 may extend from upstream of the underbody catalyst 176 to upstream of a muffler 172. After flowing through the front catalyst 170, exhaust may either flow through the underbody catalyst 176, or flow through the bypass passage 173, bypassing the underbody catalyst 176. Routing of exhaust through the main exhaust passage 102 or the bypass passage 173 may be regulated via adjustments to a position of a diverter valve 182 coupled to the main exhaust passage 102 at a junction of the main exhaust passage 102 and the bypass passage 173, downstream of the underbody catalyst 176. For example, the exhaust catalyst system 160 may be operated in a first mode, where the diverter valve 182 is shifted to a first position to flow exhaust via the underbody catalyst 176. As another example, the exhaust catalyst system 160 may be operated in a second mode, where the diverter valve 182 is shifted to a second position to flow exhaust via the bypass passage 173 bypassing the underbody catalyst 176. In one example, the exhaust catalyst system 160 may be operated in the first mode during conditions including a lower than threshold risk of water condensation in the underbody catalyst, a higher than threshold cylinder air mass, a lower than an upper threshold exhaust temperature, and a higher than a lower threshold exhaust temperature. In another example, exhaust catalyst system 160 may be operated in the second mode during conditions including a deceleration fuel shut-off condition. Engine fueling conditions during which the second operating mode may be used may include conditions when there is a higher than threshold risk of water condensation in the underbody catalyst, a higher than upper threshold exhaust temperature (for example, during a hot start where the exhaust is too hot), and a lower than lower threshold exhaust temperature (for example, during a cold start where the exhaust is too cold).

One or more temperature and oxygen sensors may be coupled to the exhaust catalyst system 160 for determining temperature and oxygen content of the exhaust entering and exiting the underbody catalyst 176. In one example, a first temperature sensor 177, and a first oxygen sensor 175 may be coupled to the main exhaust passage 102 upstream of the underbody catalyst 174, and a second oxygen sensor 179 may be coupled downstream of the underbody catalyst 176. A second temperature sensor 178 may be coupled to the underbody catalyst 176 to estimate the temperature of the catalyst brick. Each of the first and the second oxygen sensors 175, and 179 may be a linear oxygen sensor or UEGO (universal or wide-range exhaust gas oxygen), a two-state oxygen sensor or EGO, or a HEGO (heated EGO). From downstream of the underbody catalyst 176, and from the bypass passage 173, exhaust may flow towards muffler 172 and exit the exhaust system via the tailpipe 35.

A heat exchanger 174 may be coupled to bypass passage 173 to cool the exhaust passing through the bypass passage 173. As the exhaust passes through the heat exchanger 174, heat from the hot exhaust may be transferred to a coolant circulating through the heat exchanger 174. In one example, the heat exchanger 174 may be a water-gas exchanger. Upon transfer of heat from the exhaust to the coolant, the warmed coolant may be circulated back to the engine (such as when engine heating is required) and/or through a heater core for heating a passenger cabin of the vehicle (such as when cabin heating is requested). Alternatively, when there are no heating demands, the warmed coolant may be flowed through a radiator for heat dissipation to the atmosphere. Detailed description of the operation and structure of exhaust catalyst system 160 will be discussed with relation to FIGS. 2A-2B, 3, 4, and 5.

In some embodiments, a regeneratable soot filter may be housed in the main exhaust passage 102 downstream of the underbody catalyst 176 to trap and oxidize soot particles in the exhaust flow.

Exhaust gas recirculation (EGR) delivery passage 180 may be coupled to the main exhaust passage 102 upstream of the front catalyst 170 to deliver external, low-pressure (LP) EGR by tapping exhaust gas from downstream of turbine 116. The delivery passage may house an EGR cooler for cooling the exhaust before delivery to the intake manifold, upstream of the compressor 114. EGR valve 52 may be opened to admit a controlled amount of exhaust gas to the compressor inlet for desirable combustion and emissions control performance. EGR valve 52 may be configured as a continuously variable valve. In an alternate example, however, EGR valve 52 may be configured as an on/off valve. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include a first exhaust temperature sensor 177 located upstream of the underbody catalyst 176, a second exhaust temperature sensor 178 located on the underbody catalyst 176, a first exhaust oxygen sensor 175 located upstream of the underbody catalyst 176, a second exhaust oxygen sensor 179 located downstream of the underbody catalyst 176, exhaust pressure sensor 128, MAP sensor 124, MAF sensor 125, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, diverter valve 182, throttle 20, EGR valve 52, wastegate 92, and fuel injector 66. The control system 14 may include a controller 12.

The controller 12 may receive input data from the various sensors, process the input data, and trigger various actuators in response to the processed input data based on instruction or code programmed therein corresponding to one or more routines. For example, the controller 12 may predict a risk of condensate formation at the underbody catalyst 176 based on inputs from one or more of underbody catalyst temperature sensor 178, exhaust temperature sensor 177, intake temperature, pressure, humidity and air-fuel ratio sensors 55-57, EGR sensors, and in response to a higher than threshold risk of water condensation at the underbody catalyst, the controller 12 may adjust the position of the diverter valve 182 to route exhaust via the bypass passage 173 bypassing the underbody catalyst 176. As another example, the controller 12 may estimate an exhaust oxygen content based on inputs from one or more exhaust oxygen sensors 175, and 179, and based on a higher than threshold exhaust oxygen content, the controller 12 may adjust the position of the diverter valve 182 to route exhaust via the bypass passage 173 bypassing the underbody catalyst 176.

Figure 2A:
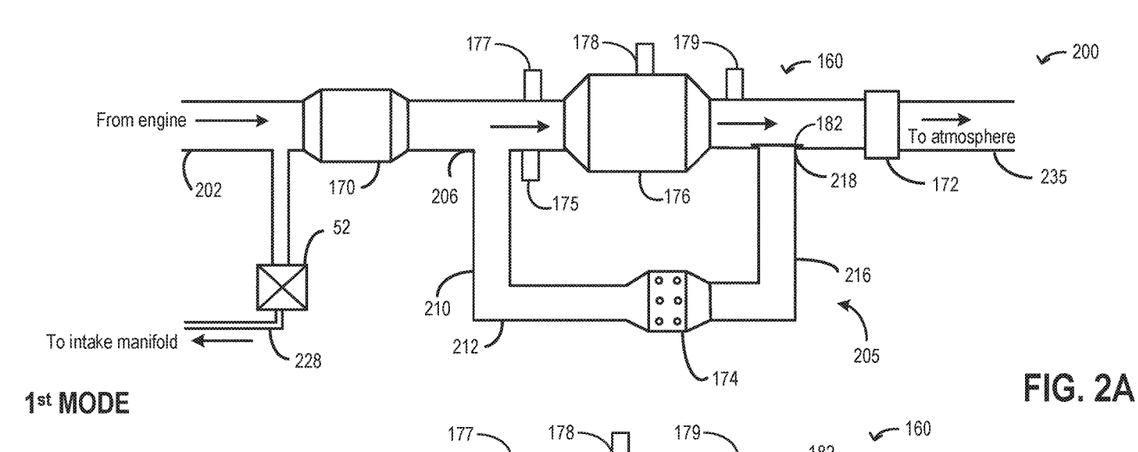
FIG. 2A shows an example embodiment of the exhaust catalyst system of FIG. 1 operating in a first mode.

FIG. 2A further elaborates the underbody catalyst system introduced in FIG. 1 and shows an example embodiment 200 of operating the underbody catalyst system of FIG. 1 in a first operating mode where exhaust flow is directed through the underbody catalyst. In one example, assembly 200 is an embodiment of exhaust catalyst system 160 of FIG. 1 and therefore may share common features and/or configurations as those already described for exhaust catalyst system 160.

Exhaust flowing from the engine passes through the front catalyst 170 and reaches the underbody catalyst system 200. A larger portion of the combustion by-products may be adsorbed, and treated at the front catalyst. The front catalyst may comprise a higher loading of precious metals compared to the underbody catalyst to facilitate optimal treatment of the by-products. The underbody catalyst may be of higher efficiency compared to the front catalyst during conditions when the cylinder air mass is higher, and the space velocity of exhaust flowing through each of the front catalyst, and the underbody catalyst is higher. When EGR is required, a part of the exhaust may be drawn from upstream of the front catalyst for recirculation to the engine intake manifold.

Exhaust gas recirculation (EGR) delivery passage 228 may be coupled to the main exhaust passage 202 downstream of the front catalyst 170 to provide low-pressure (LP) EGR. EGR valve 52 may be opened to admit a controlled amount of exhaust to the intake manifold for desirable combustion and emissions control performance. EGR valve 52 may be configured as a continuously variable valve or as an on/off valve.

Underbody catalyst 176 may be coupled to the main exhaust passage 202 upstream of the front catalyst 170. In one example, the underbody catalyst 176 may be configured to trap $NO_x$ from the exhaust flow when the exhaust flow is lean, and to reduce the trapped $NO_x$ when the exhaust flow is rich. The underbody catalyst 176 may also be configured to disproportionate $NO_x$, or to selectively reduce $NO_x$, with the aid of a reducing agent. In another example, underbody catalyst 176 may be configured to oxidize residual hydrocarbons and/or carbon monoxide in the exhaust flow. A plurality of sensors may be coupled to the exhaust catalyst system 200 for determining temperature, and oxygen content of the exhaust entering and exiting the underbody catalyst 176, and underbody catalyst brick temperature. In one example, a first temperature sensor 177, and a first oxygen sensor 175 may be coupled to the main exhaust passage 202 upstream of the underbody catalyst 176, and a second oxygen sensor 179 may be coupled to the main exhaust passage 202 downstream of the underbody catalyst 176. A second temperature sensor 178 may be coupled to the underbody catalyst 176 to estimate the catalyst brick temperature. Water content of the exhaust, and a risk of condensate formation on the underbody catalyst 176, may be estimated based on the catalyst brick temperature as estimated by the second temperature sensor 178 and further based on factors including ambient humidity, EGR level, exhaust temperature, etc.

An inlet pipe 210 of an underbody catalyst bypass assembly 205 may be coupled to the exhaust passage 202 at junction 206, downstream of the front catalyst 170, and upstream of the underbody catalyst 176. The inlet pipe may lead to a bypass passage 212 housing a heat exchanger 174. The heat exchanger may be coupled to a coolant system of the engine. A coolant may be circulated through the heat exchanger 174 for recovering heat from the exhaust. Upstream of the heat exchanger 174, the bypass passage 212 may end in an outlet pipe 216 leading back to the exhaust passage 202. The inlet 210 and outlet pipes 216 may be at right angles to the passage 212 and the main exhaust passage 202. The outlet pipe 216 may join the exhaust passage 202 at a junction 218 located downstream from the junction 206 and underbody catalyst 176. A diverter valve may be coupled to the main exhaust passage 302 at the junction 218 to regulate the flow of exhaust via one of the main exhaust passage 202, and the bypass passage 212. In one example, the diverter valve may be adjusted to a first position to route exhaust through the main exhaust passage 202, and the underbody catalyst. In another example, the diverter valve may be adjusted to a second position to route exhaust through the bypass passage 212 and the heat exchanger 174. Further downstream of junction 218, a muffler 272 may be coupled to the main exhaust passage 202. After passing through the muffler 272 the exhaust may be released to the atmosphere through a tailpipe 235.

As such, the first operating mode represents a first setting of the diverter valve 182 that enables exhaust flow control. When in the first operating mode, due to the first position of the diverter valve 182, exhaust may flow to the muffler without entering the underbody catalyst bypass assembly 205. Therefore, all exhaust exiting the front catalyst 170 may flow through the underbody catalyst 176. After passing through the underbody catalyst 176, the exhaust may flow through the muffler 272, and exit to the atmosphere via the tailpipe 235. As such, during operation in the first operating mode, since exhaust may not flow through the heat exchanger 174 housed in the bypass passage 212, exhaust heat may not be recovered at the heat exchanger 174.

The first operating mode may be selected during conditions when exhaust flow via the underbody catalyst 176 is desired. In one example, the first mode may be selected during cold-start conditions after the risk of water condensation at the underbody catalyst 176 has reduced to below a threshold. During conditions when the risk of condensation is higher than the threshold, water may condense on the underbody catalyst 176 and extract energy from the catalyst for evaporation, which may affect catalyst functionality by reducing the catalyst temperature. Water content of the exhaust may be estimated based on each of an ambient humidity, an exhaust air-fuel ratio, exhaust temperature, and an EGR level of the engine. The water content of the exhaust may increase as humidity increases, and EGR level/flow increases. The risk of condensation at the underbody catalyst may be predicted based on each of the estimated water content of the exhaust and a brick temperature of the underbody catalyst, and the risk may increase with an increase in the estimated water content or a decrease in the brick temperature. The predicted risk of condensation may be further based on an exhaust air-fuel ratio relative to stoichiometry, the predicted risk increasing as a duration of engine operation at leaner than stoichiometry increases. During cold-start conditions, once the risk of condensation is lower than the threshold, by flowing hot exhaust through the underbody catalyst 176, the temperature of the catalyst may be increased, thereby expediting attainment of light-off temperature.

In another example, the first operating mode may be selected when the cylinder air mass is higher than a threshold. During a higher than threshold cylinder air mass, exhaust may be routed through the underbody catalyst 176 in order to improve emissions quality and also reduce backpressure exerted by the exhaust system. Cylinder air mass may be inferred based on input from one of a manifold airflow (MAF) and the manifold air pressure (MAP) sensor.

In yet another example, the first mode may be selected during conditions when one of exhaust temperature is higher than a lower threshold, and exhaust temperature is lower than an upper threshold. Owing to a coating on the underbody catalyst surface, the underbody catalyst may have higher conversion efficiencies in a defined exhaust temperature range, therefore outside the range exhaust temperature (above or below the range), catalyst functionality may be degraded.

Figure 2B:
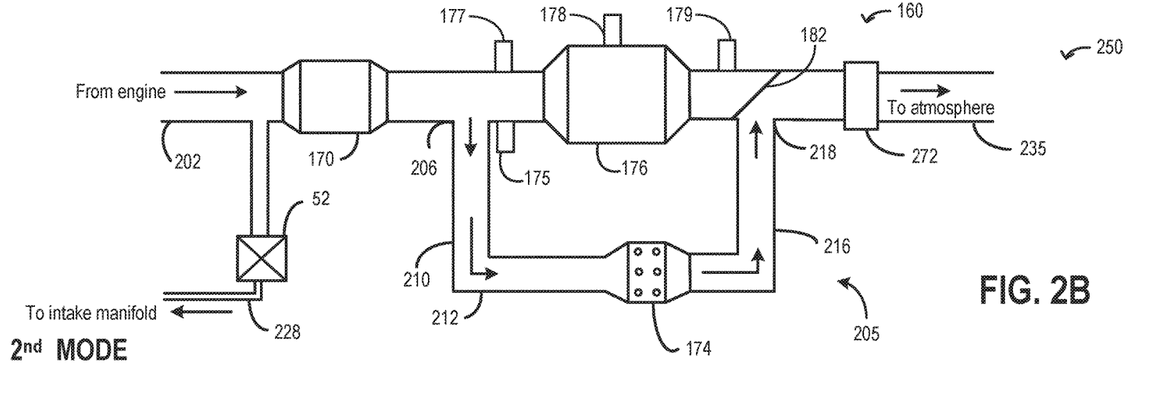
FIG. 2B shows an example embodiment of the exhaust catalyst system of FIG. 1 operating in a second mode.

FIG. 2B shows a schematic view 250 of an example embodiment of underbody catalyst system 200 in a second operating mode where exhaust flow bypasses the underbody catalyst. Components previously introduced in FIG. 2A are numbered similarly and not reintroduced.

As such, the second operating mode represents a second setting of the diverter valve 182 that enables exhaust flow control. When in the second operating mode, due to the second position of the diverter valve 182, exhaust may flow into the underbody catalyst bypass assembly 205 though the inlet pipe 210 (as shown by the arrows), bypassing the underbody catalyst 176. In the second operating mode, the exhaust flows through the heat exchanger 174 from a first end of the heat exchanger proximal to the inlet pipe 210 to the second end of the heat exchanger 174 proximal to the outlet pipe 216. At the heat exchanger 174, heat from the exhaust may be transferred to the coolant circulating through the heat exchanger 174. The heated coolant may then be circulated back through the engine (e.g., through the cylinder head to provide engine heating during cold-start conditions) and/or circulated through a heater core of the vehicle and thereafter the recovered heat may be utilized for functions such as warming the passenger cabin, thereby improving engine efficiency. Under circumstances when the heat recovered at the heat exchanger 174 is not required for heating vehicle components, the heat may be transferred to a radiator for dissipation to the atmosphere. After passing through the heat exchanger 174, the cooled exhaust flows through the outlet pipe 216 and exits the underbody catalyst bypass assembly 205. The exhaust re-enters the main exhaust passage 202 at the junction 218 and flows downstream towards the muffler 272. After passing through the muffler 272, the exhaust exits to the atmosphere via the tailpipe 235.

The second operating mode may be selected during conditions when exhaust flow via the underbody catalyst 176 is not desired. In one example, the second mode may be selected during conditions with a higher than threshold risk of condensate formation in the underbody catalyst 176. During cold-start conditions, the risk of water condensation on the underbody catalyst may be higher due to the lower temperature of the exhaust and the underbody catalyst 176. Therefore, during cold-start conditions, exhaust may be routed to bypass the underbody catalyst 176 for a duration until the risk of condensate formation reduces to below the threshold. In another example, the second mode may be selected during conditions when the exhaust temperature is lower than the lower threshold or higher than the upper threshold.

In yet another example, the second mode may be selected during engine non-fueling conditions such as during a deceleration fuel shut-off (DFSO) condition. During such conditions, the oxygen content in the exhaust may increase to above a threshold which may cause oxygen saturation at the underbody catalyst 176. The oxygen saturation may result in reduction in the catalyst's ability to convert NOx adsorbed on the catalyst, thereby affecting emissions quality.

A transition from operation in the first mode to operation in the second mode may be carried out in response to a higher than threshold risk of condensation at the underbody catalyst 176, a deceleration fuel shut-off (DFSO) event, a lower than lower threshold exhaust temperature, and a higher than upper threshold exhaust temperature. A transition from operation in the second mode to operation in the first mode may be carried out in response to a lower than threshold risk of condensation at the underbody catalyst 176, a higher than lower threshold exhaust temperature, and a lower than upper threshold exhaust temperature and a higher than threshold cylinder air mass. Further, in response to the catalyst temperature falling below a threshold temperature while the risk of condensation on the underbody catalyst is lower, the diverter valve may be transitioned to the first position earlier, and in response to the catalyst temperature falling below a threshold temperature while a risk of condensation on the underbody catalyst is higher, the diverter valve may be transitioned to the first position later.

In one example, during a DFSO event, a transition from the second operating mode to the first operating mode may be carried out if the temperature of the underbody catalyst decreases to below a threshold. Flowing exhaust through the underbody catalyst during a DFSO event may increase the oxygen concentration in the underbody catalyst, which may cause an increased fuel usage during catalyst regeneration. However, if the temperature of the underbody catalyst decreases to below the threshold, spark timing may have to be retarded (which also causes increased fuel consumption) to increase exhaust temperature and underbody catalyst temperature. Therefore, the controller may take into account the potential fuel consumption penalty due to oxygen saturation, and underbody catalyst temperature reduction, and may determine if exhaust is to be routed through the underbody catalyst or if the underbody catalyst is to be bypassed based on which penalty is lower. For example, if the fuel penalty associated with retarding spark to raise catalyst temperature is lower, the underbody catalyst may not be bypassed. Else, if the fuel penalty associated with catalyst regeneration is lower, the underbody catalyst may be bypassed. During cold-start conditions, the diverter valve may be held at the second position (system operated in second mode) for a period based on the water content of the exhaust; and after the period has elapsed, the diverter valve may be actuated to the first position (transitioned to system operating in first mode) to flow exhaust via the front catalyst and then the underbody catalyst in the main exhaust passage. The period may be increased as the water content of the exhaust increases.

In this way, the systems of FIGS. 1 and 2A-2B provide for an engine system, comprising: an engine intake manifold including each of a mass airflow (MAF) sensor and a manifold pressure (MAP) sensor, an engine exhaust manifold including a main exhaust passage housing a front catalyst upstream of an underbody catalyst, and a bypass passage coupled to the main exhaust passage from downstream of the front catalyst to downstream of the underbody catalyst, the bypass passage including a heat exchanger; a coolant system fluidically coupling the heat exchanger to a heater core; a diverter valve coupled downstream of the underbody catalyst at a junction of the main exhaust passage and the bypass passage, an exhaust temperature sensor; an exhaust oxygen sensor; and a controller with computer readable instructions stored on non-transitory memory for: responsive to engine operation at leaner than threshold air-fuel ratio, actuating the diverter valve from a first position that enables exhaust flow through the underbody catalyst to a second position that enables exhaust flow through the bypass passage and the heat exchanger, while bypassing the underbody catalyst, estimating a catalyst temperature based on a duration of operation at the threshold air-fuel ratio, in response to the catalyst temperature falling below a threshold temperature while a water content of the exhaust is higher, transitioning the diverter valve to the first position earlier, and in response to the catalyst temperature falling below a threshold temperature while a water content of the exhaust is lower, transitioning the diverter valve to the first position later.

Figure 3:
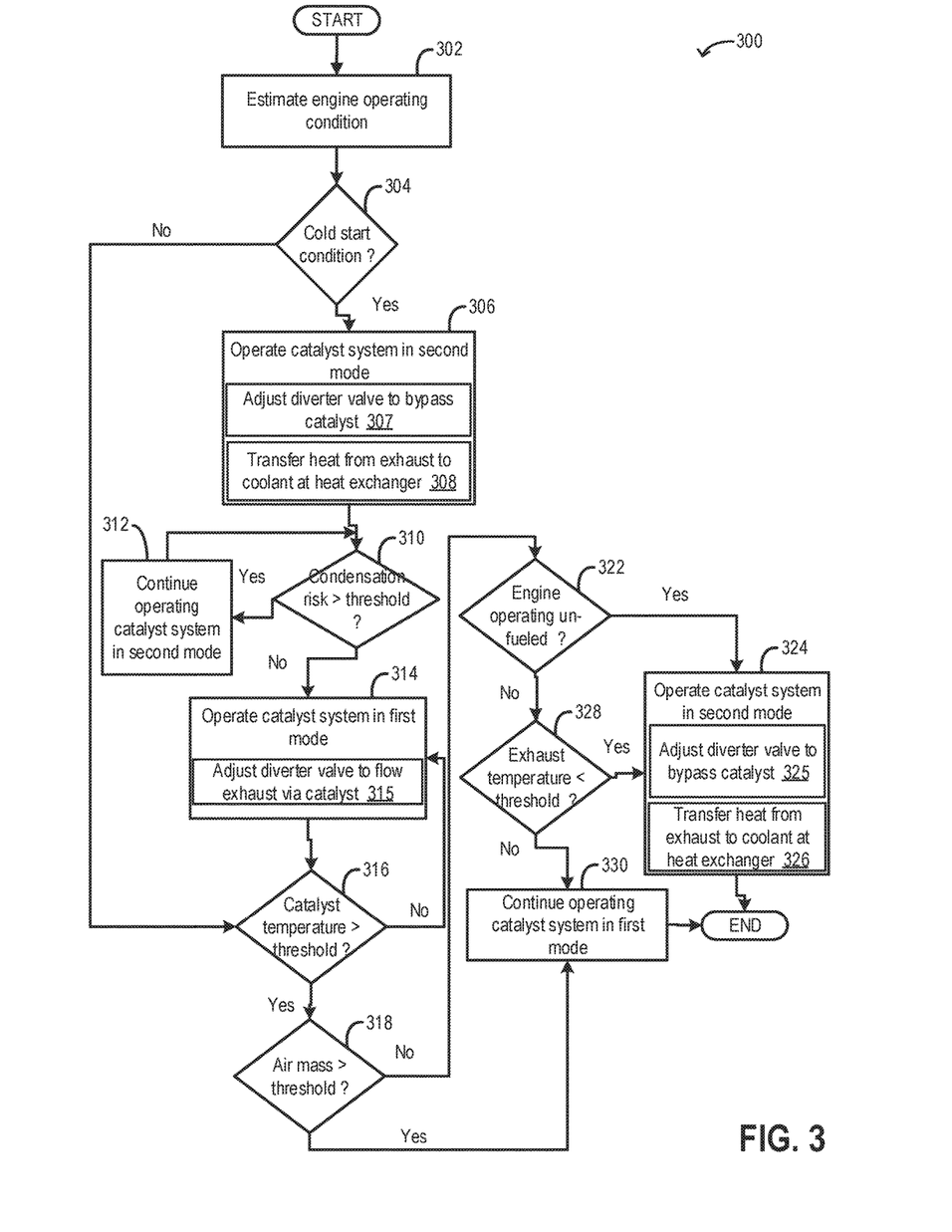
FIG. 3 shows a flow chart illustrating an example method that may be implemented for adjusting exhaust flow through the exhaust catalyst system of FIG. 1.

FIG. 3 illustrates an example method 300 for operating an exhaust underbody catalyst system (such as exhaust catalyst system 160 in FIG. 1 and FIGS. 2A-2B) to reduce engine emissions. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2A-2B. The controller may employ engine actuators of the engine system to adjust engine operation according to the methods described below.

At 302, engine conditions may be estimated by the controller based on inputs from a plurality of sensors. The estimated engine operating conditions may include engine temperature, engine load, engine speed, air fuel ratio, exhaust temperature, cylinder air mass, underbody catalyst brick temperature, etc. Also, ambient conditions including ambient temperature, humidity, barometric pressure, etc. may be estimated.

At 304, the routine includes determining if the vehicle engine is operating under cold-start conditions. An engine cold-start condition may be confirmed when the engine is started after a prolonged period of engine inactivity, when the engine temperature is lower than a threshold (such as below an exhaust underbody catalyst light-off temperature), and while ambient temperature is below a threshold.

During such a condition, due to lower temperature of the exhaust, higher exhaust water content, and lower underbody catalyst brick temperature, there may be a higher than threshold risk of water condensation on the underbody catalyst. The risk of condensate formation may be determined based on inputs from a plurality of sensors including exhaust temperature sensors (such as sensor 177 in FIGS. 2A-2B), underbody catalyst temperature sensor (such as temperature sensor 178 in FIGS. 2A-2B), exhaust oxygen sensors (such as oxygen sensors 175, and 179 in FIGS. 2A-2B) and ambient humidity sensor. The controller may estimate the risk of condensate formation through a determination that directly takes into account an estimated exhaust water content, and a measured underbody catalyst brick temperature, such as increasing the risk of condensate formation with increasing exhaust water content, and decreasing underbody catalyst brick temperature. The controller may alternatively determine the risk of condensate formation based on a calculation using a look-up table with the input being exhaust water content, and underbody catalyst brick temperature and the risk of condensate formation is the output. The risk of condensate formation may be further determined based on an exhaust air-fuel ratio relative to stoichiometry, the predicted risk increased as a duration of engine operation at leaner than stoichiometry increases.

During conditions with a higher than threshold risk of water condensation at the underbody catalyst, water condensation and subsequent evaporation may take place at the underbody catalyst, thereby increasing energy dissipation at the catalyst. As a result, there may be delays in catalyst light-off caused by water condensation-evaporation cycles.

If engine cold-start conditions are confirmed, the routine moves to 306 in order to operate the underbody catalyst system in a second operating mode, assuming that the risk of condensation is higher. Operating in the second mode, as described in relation to FIG. 2B, includes, at 307, shifting a diverter valve (such as diverter valve 182 in FIGS. 2A-B) to a second position. Due to the second position of the valve, exhaust flow from the bypass passage into the main passage may not be obstructed, therefore exhaust may flow through the bypass passage (such as bypass passage 212 in FIGS. 2A-2B), bypassing the underbody catalyst (such as catalyst 176 in FIGS. 2A-2B) housed in the main exhaust passage. As exhaust is routed through the bypass passage, exhaust may flow through a heat exchanger (such as heat exchanger 174 in FIGS. 2A-2B). After flowing through the heat exchanger, the exhaust may flow further downstream via the bypass passage and then re-enter the main exhaust passage downstream of the underbody catalyst, and finally exit to the atmosphere via the tailpipe. By flowing exhaust through the bypass, condensation and evaporation of water at the underbody catalyst may be reduced, and the exhaust water may condense along the main exhaust passage further downstream from the underbody catalyst.

During exhaust flow via the heat exchanger coupled to the bypass passage, at 308, heat from the exhaust may be transferred to a coolant circulating through the heat exchanger. The coolant warmed via heat transfer at the heat exchanger may be circulated to a heater core so that it can be utilized for heating other components of the vehicle during the engine cold-start, such as a cylinder head, an engine block, and a vehicle cabin space. In case of the cold-start, the vehicle cabin temperature may be low and cabin heating may be desired. Thus, based on cabin heating demand, as requested by a vehicle operator (e.g., based on a cabin temperature setting), heat may be transferred from the heater core to the cabin. For example, air may be drawn into the cabin via the heater core, thereby enabling the cabin to be warmed. After meeting the cabin heating demand, the warmed coolant may also be circulated to an engine block and cylinder head to raise engine temperatures, thereby improving engine performance during cold conditions.

At 310, the routine includes determining if the risk of condensation at the underbody catalyst has been lowered below a threshold. The risk of condensation may reduce as engine combustion progresses due to the higher exhaust temperature causing a higher proportion of the exhaust water condensation to take place at the main exhaust passage downstream from the underbody catalyst, and/or a higher proportion of the exhaust water being evaporated during exhaust flow through the underbody catalyst. Also, exhaust water content may reduce based on changes in ambient conditions, such as ambient humidity. If it is determined that the risk of condensation continues to be higher than the threshold, at 312, the diverter valve may be maintained in the second position, and the catalyst system may be operated in the second mode (bypassing the underbody catalyst).

If it is determined that the risk of condensation has reduced to below the threshold, the routine moves to 314 in order to operate the underbody catalyst system in a first operating mode. Operating in the first mode, as described in relation to FIG. 2A, includes, at 315, shifting the diverter valve to a first position. Due to the first position of the valve, exhaust flow from the bypass passage into the main passage may be obstructed, therefore, exhaust may flow via the main exhaust passage and the underbody catalyst, and not flow via the exhaust bypass passage. By flowing the hot exhaust through the underbody catalyst, the catalyst temperature may be increased which may expedite attainment of underbody catalyst light-off temperature.

At 316, the routine includes determining if the underbody catalyst temperature is higher than a threshold temperature. The threshold temperature may correspond to the underbody catalyst light-off temperature. Once the underbody catalyst attains the light-off temperature, it can operate with optimal functionality. The underbody catalyst temperature may be inferred based on inputs exhaust temperature sensors coupled to the main exhaust passage, and the underbody catalyst. Also, the temperature of the underbody catalyst may be estimated based on a duration of engine operation at a stoichiometric or leaner than stoichiometric air-fuel ratio.

Also, if at step 304 it is determined that the engine is not operating under cold-start conditions, the routine may directly move to step 316. If it is determined that the catalyst temperature is lower than the threshold, and further increase in temperature is desired for optimal operation, the catalyst system may be continued to be operated in the first mode, and exhaust is routed via the underbody catalyst.

If it determined that the exhaust temperature is higher than the threshold temperature, it may be inferred that the underbody catalyst has attained the light-off temperature and is better able to reduce combustion by-products such as oxides of nitrogen, carbon monoxide, and hydrocarbons, thereby improving emissions quality.

At 318, the routine includes determining if the cylinder air mass is higher than a threshold air mass. The cylinder air mass may be a function of intake air flow and engine speed, and may be determined based on inputs from one or more of a manifold air flow sensor, and a manifold pressure sensor. The threshold air mass may correspond to a cylinder air mass which results in a higher than desired exhaust back pressure, and may further cause increased tailpipe emissions.

If it is determined that the engine is operating with a lower than threshold cylinder air-mass, the routine may proceeds to step 322, wherein it may be determined if the engine is operating un-fueled (engine non-fueling condition). The engine non-fueling conditions may include a deceleration fuel shut-off (DFSO) condition when the air-fuel ratio is leaner than stoichiometry. During engine non-fueling conditions, there may be an increase in exhaust oxygen content, which may cause the underbody catalyst to be saturated with oxygen. Oxygen saturation at the underbody catalyst may result in a decrease in catalyst functionality. Therefore, if it is determined that the engine is operating un-fueled, in order to reduce oxygen deposition on the underbody, at 324, the catalyst system may be operated in the second mode.

In order to operate the catalyst system in the second mode, at 325, the diverter valve may be shifted to the second position. Due to the second position of the valve, exhaust may flow through the bypass passage, bypassing the underbody catalyst. As exhaust is routed through the bypass passage, exhaust may flow through the heat exchanger. At 326, heat from the exhaust may be transferred to the coolant flowing through the heat exchanger. The heat recovered by the coolant at the heat exchanger may be used for providing heat to one or more vehicle components such as the cylinder head, and passenger cabin. Coolant flow rate through the heat exchanger, the passenger cabin, and the engine block may be adjusted based on the engine heating demand, and cabin heating demands. Under circumstances when the heat recovered at the heat exchanger is not desired for heating vehicle components, the heat may be transferred to a radiator for dissipation.

If it is determined that the engine is not operating un-fueled, at 328, the routine includes determining if the exhaust temperature is lower than a first threshold temperature. Also, it may be determined if the exhaust temperature is higher than a second threshold temperature, the second threshold temperature higher than the first threshold temperature. If exhaust having a lower than a lower threshold (first) temperature flows through the underbody catalyst, the operating temperature of the catalyst may decrease which may adversely affect catalyst performance. Also, if exhaust having a higher than an upper threshold (second) temperature flows through the underbody catalyst, due to a coating on the catalyst surface, catalyst functionality may be reduced. The first threshold temperature may be lower than the second threshold temperature, and for optimal operation of the underbody catalyst, the catalyst temperature may be maintained between the first threshold temperature and the second threshold temperature.

If it is determined that the exhaust temperature is lower than the first threshold temperature or higher than the second threshold temperature, the routine may proceed to step 334 to operate the exhaust system in the second mode. In the second mode, since the exhaust is routed to flow via the bypass passage bypassing the underbody catalyst, the temperature of the catalyst may not be affected by the exhaust temperature.

If it is determined at 328 that the exhaust temperature is higher than the first threshold or lower than the second threshold, the exhaust system may be continued to be operated in the first mode, and exhaust may be routed through the underbody catalyst. However, if at any time it is determined that the exhaust water content has increased due to factors such an increased exhaust gas recirculation, leaner than stoichiometry air-fuel ratio, and higher ambient humidity, and there is a higher than threshold risk of condensate formation at the underbody catalyst, the diverter valve may be shifted to the second position to operate the catalyst system in the second mode wherein the underbody catalyst is bypassed to reduce condensate formation at the catalyst.

In this way, operation of the exhaust underbody catalyst system may be improved by selecting the second mode responsive to one of risk of condensate formation at underbody catalyst higher than a threshold risk, exhaust temperature being lower than a lower threshold, exhaust temperature being higher than an upper threshold, and exhaust oxygen concentration being higher than a threshold concentration; and selecting the first mode responsive to one of the exhaust temperature being lower than the lower threshold or higher than the upper threshold, and exhaust oxygen concentration being lower than the threshold concentration.

Figure 4:
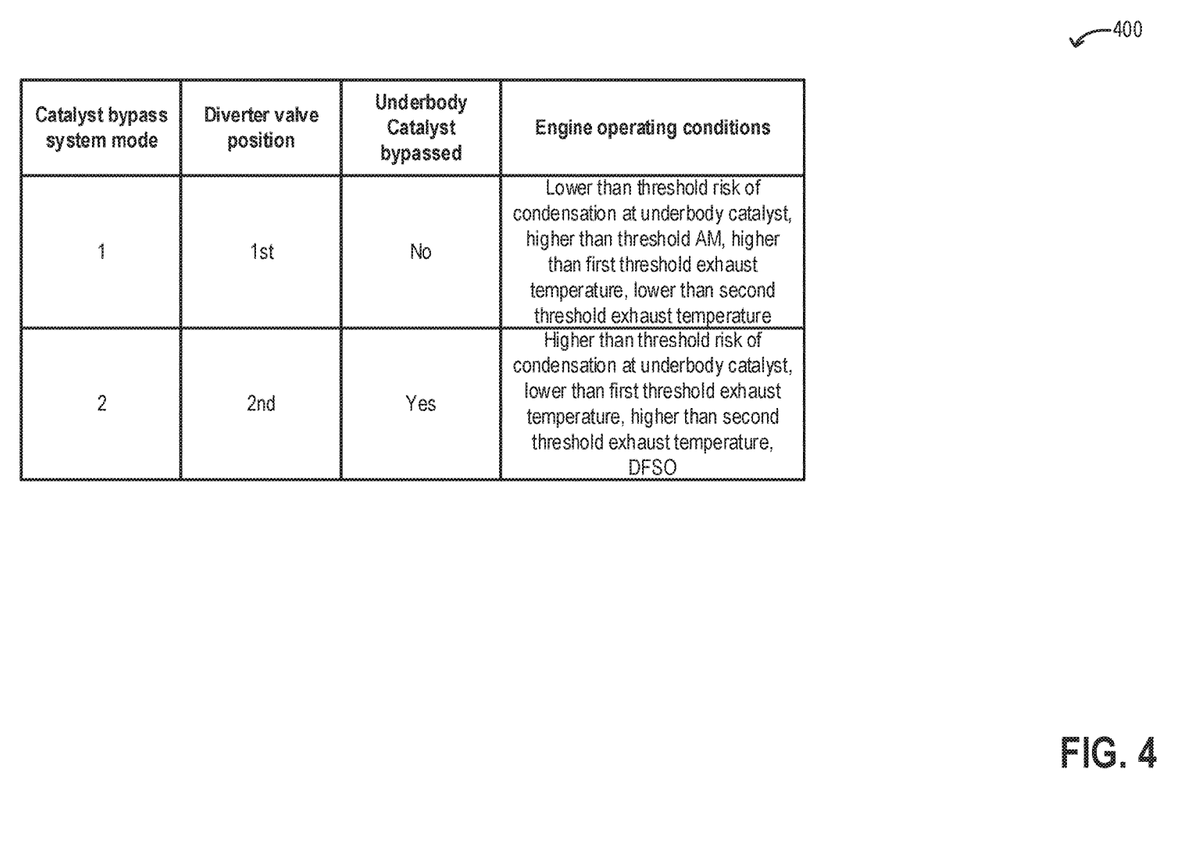
FIG. 4 shows a table illustrating the different modes of operation of the exhaust catalyst system of FIG. 1.

FIG. 4 is a table 400 showing example modes of operation of the exhaust catalyst system of FIG. 1. An engine controller may select one of the operating modes based on engine conditions and heating requirements. The exhaust catalyst is an underbody catalyst coupled downstream of a front catalyst in the main exhaust passage, the underbody catalyst having a higher light-off temperature than the front catalyst. Based on the selected operating mode, the position of a diverter valve coupled to the main exhaust passage, downstream of the underbody catalyst at a junction of the main exhaust passage, may be varied to flow exhaust either through the catalyst or via the bypass passage.

In one example, the controller may operate the catalyst system in a first mode. In the first mode, the diverter valve may be shifted to a first position, wherein exhaust flow from the main passage to the bypass passage is obstructed. Due to the position of the valve, exhaust may flow through the underbody catalyst in the main exhaust passage. Exhaust flowing through the catalyst in the main passage includes exhaust flowing from downstream of the front catalyst to an exhaust tailpipe via the underbody catalyst through the main passage. The catalyst bypass system may be operated in the first mode during one or more conditions such as a lower than threshold risk of water condensation in the underbody catalyst, a higher than threshold cylinder air mass, a lower than an upper threshold exhaust temperature, and a higher than a lower threshold exhaust temperature. The risk of water condensation in the underbody catalyst may be predicted based on water content in the exhaust, and catalyst brick temperature. The water content of exhaust gas may be estimated based on each of an EGR level of the engine, air-fuel ratio, an engine temperature, and an ambient humidity. Predicting a risk of water condensation may include increasing the predicted risk as one or more of the catalyst brick temperature decreases, the EGR level of the engine increases, the engine temperature decreases, and the ambient humidity increases, and decreasing the predicted risk as one or more of the catalyst temperature increases, the EGR level of the engine decreases, the engine temperature increases, and the ambient humidity decreases.

In another example, the controller may operate the catalyst system in a second mode. In the second mode, the diverter valve may be shifted to a second position, wherein exhaust flow from the main passage to the bypass passage is not obstructed. Due to the position of the valve, exhaust may flow through the bypass passage bypassing the underbody catalyst. Exhaust flowing through the bypass passage includes exhaust flowing from downstream of the front catalyst to the exhaust tailpipe via the bypass passage, without flowing through the underbody catalyst. The catalyst bypass system may be operated in the second mode during engine non-fueling conditions and certain engine fueling conditions. The engine non-fueling conditions may include a deceleration fuel shut-off condition, and the engine fueling conditions during which the second operating mode is used may include a higher than threshold risk of water condensation in the underbody catalyst, a higher than an upper threshold exhaust temperature (for example during a hot start), and a lower than a lower threshold exhaust temperature. During operating in the second mode, exhaust may flow through a heat exchanger coupled to the bypass passage and during exhaust flow through the heat exchanger in the bypass passage, heat from the exhaust may be transferred to a coolant circulating through the heat exchanger. Responsive to an engine heating demand, the heated coolant may be circulated through an engine block; and responsive to a cabin heating demand, the heated coolant may be circulated through the heater core.

In this way, based on a predicted risk of condensate formation at the underbody catalyst, exhaust temperature, and exhaust oxygen content, exhaust may be routed through the underbody catalyst, or a bypass passage avoiding the underbody catalyst.

Figure 5:
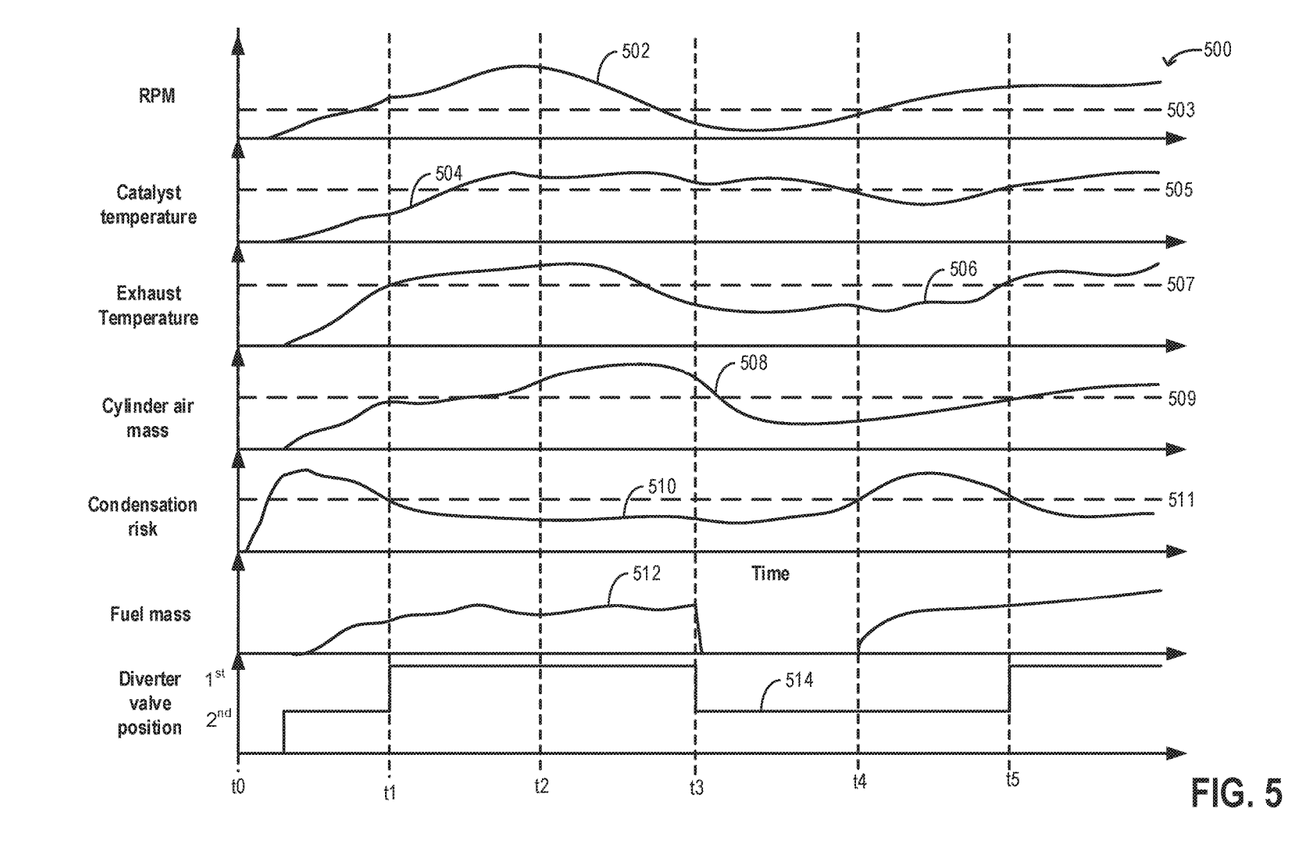
FIG. 5 shows an example operation of the exhaust catalyst system of FIG. 1.

FIG. 5 shows an example operating sequence 500 of the exhaust underbody catalyst system. Exhaust flow through the underbody catalyst or the bypass passage is determined based on engine operating conditions. The horizontal (x-axis) denotes time and the vertical markers t1-t5 identify significant times in the operation of the exhaust bypass system.

The first plot, line 502, shows a variation in engine revolutions per minute (RPM) over time. Dotted line 503 shows a threshold engine RPM below which the engine may be operated un-fueled. The second plot, line 504, shows underbody catalyst brick temperature. Dotted line 505 shows a threshold catalyst temperature below which the underbody catalyst may not be fully functional. The third plot, line 506, shows a variation in exhaust temperature over time. Dotted line 507 shows a threshold exhaust temperature below which the exhaust may not be routed via the underbody catalyst. The catalyst brick temperature and the exhaust temperature may be estimated via exhaust temperature sensor(s). The fourth plot, line 508, shows a variation in cylinder air mass as estimated via a manifold air flow sensor, and/or a manifold air pressure sensor. Dotted line 509 shows a threshold cylinder air mass above which exhaust may be routed through the underbody catalyst. The fifth plot, line 510, shows a predicted risk of water condensation on the underbody catalyst, as estimated based on exhaust water content, and underbody catalyst brick temperature. Dotted line 511 shows a threshold condensation risk above which a significant amount of condensate may form on the underbody catalyst, thereby adversely affecting catalyst functionality. The sixth plot, line 512, shows the fuel mass (amount of fuel) as injected into an engine cylinder for combustion. The seventh plot, line 514, shows the position of a diverter valve coupled to the main exhaust passage downstream of the underbody catalyst at a junction of the main exhaust passage and the bypass passage.

Shortly after t0, an engine start is requested. Due to the engine being started from rest after a period of inactivity during which the vehicle was not being propelled, and further due to cooler ambient conditions, the engine start may be an engine cold-start. The engine may start under cold-start conditions with lower than threshold exhaust temperature, and underbody catalyst brick temperature. Due to cold-start conditions, and the lower than threshold exhaust temperature, the risk of condensate formation at the underbody catalyst may be higher than a threshold risk level. Therefore, during this time, exhaust may not be routed through the underbody catalyst to reduce dissipation of energy from the catalyst caused by condensate evaporation. In response to the higher than threshold risk for condensate formation at the underbody catalyst, the controller may send a signal to an actuator coupled to the diverter valve to shift the valve to a second position in order to route exhaust via the bypass passage avoiding the underbody catalyst.

Between t0 and t1, the exhaust temperature may steadily increase, and water from the exhaust may condense on the main exhaust passage upstream and/or downstream of the underbody catalyst. Correspondingly, the risk of condensate formation at the underbody catalyst may decrease. At time t1, the risk of condensate formation may reduce to below the threshold. In response to the reduction in the risk of condensate formation, the controller may send a signal to an actuator coupled to the diverter valve to shift the valve to a first position in order to route exhaust via the main exhaust passage and the underbody catalyst. Between time t1, and t2, as hot exhaust is passed through the underbody catalyst, temperature of the underbody catalyst may steadily increase.

At time t2, it may be inferred that the underbody catalyst has attained the light-off temperature and is fully functional. Also, at this time, the cylinder air mass may increase to above the threshold, and in order to maintain lower exhaust back pressure while improving emissions quality, between time t2, and t3, exhaust may be continued to be routed via the underbody catalyst.

At time t3, the engine RPM may reduce to below the threshold RPM due to an operator pedal tip-out and a drop in torque demand, and in order to improve the fuel efficiency of the engine, the engine may be operated un-fueled. In response to the lower than threshold engine RPM, the fuel mass injected to the cylinders may reduce to zero. Due to the non-fueling condition of the engine, where the fueling is deactivated but intake and/or exhaust valves continue to pump air through the engine cylinders, the oxygen content of the exhaust may increase. Also at this time, the exhaust temperature may reduce to below the threshold temperature. In order to reduce the possibility of oxygen saturation at the underbody catalyst, and to maintain the temperature of the catalyst at an optimal level, the diverter valve may be shifted to the second position in order to flow the cooler and oxygen rich exhaust via the bypass passage avoiding the underbody catalyst. Between time t3, and t4, as the engine non-fueling conditions continue, the exhaust may be continued to be routed bypassing the underbody catalyst.

At time t4, the engine RPM may increase to above the threshold RPM due to an operator pedal tip-in and a rise in torque demand, and correspondingly, fueling may be resumed, and there may be a decrease in the exhaust oxygen content. However, at this time, the underbody catalyst temperature may be reduced to below the threshold temperature and there may be an increase in the risk of condensate formation at the underbody catalyst. Also, at this time, the exhaust temperature may continue to remain below the threshold. Therefore, in order to reduce the possibility of water condensation at the underbody catalyst, and to avoid further reduction of catalyst temperature, between time t4 and t5, the diverter valve may be maintained at the second position, and exhaust may continue to bypass the underbody catalyst.

At time t5, the underbody catalyst temperature may increase to above the threshold temperature, the exhaust temperature may reduce to below the threshold temperature, and the risk of condensation may also reduce to below the threshold. Further, the cylinder air mass may increase to above the threshold air mass. Therefore, in order to route exhaust via the underbody catalyst, the diverter valve may be shifted to the first position. After time t5, exhaust may continue to flow via the underbody catalyst, and combustion by-products such as oxides of nitrogen, carbon monoxide, and hydrocarbons may be effectively reduced at the catalyst.

In one example, method for an engine, comprising: during engine non-fueling conditions, flowing exhaust through a bypass passage while bypassing an exhaust underbody catalyst positioned in a main exhaust main passage, via a valve positioned downstream of the catalyst; and during engine fueling conditions, selectively flowing exhaust through the bypass passage based on each of a temperature and water content of the exhaust. The preceding example method may additionally or optionally further comprise, estimating the water content of the exhaust based on each of an ambient humidity, an exhaust air-fuel ratio, and an EGR level of the engine. Any or all of the preceding examples, further comprise, additionally or optionally, predicting a risk of condensation at the underbody catalyst based on each of the estimated water content of the exhaust and a brick temperature of the underbody catalyst, the risk increased the estimated water content increases or as the brick temperature decreases. In any or all of the preceding examples, additionally or optionally, the selectively flowing includes: responsive to exhaust temperature being lower than a lower threshold or higher than a higher threshold, flowing the exhaust through the bypass passage for a duration until the water content of the exhaust has been lowered below a threshold content or the brick temperature of the catalyst has been raised above a threshold temperature. In any or all of the preceding examples, additionally or optionally, the selectively flowing includes: responsive to exhaust temperature being lower than a lower threshold or higher than a higher threshold, flowing the exhaust through the bypass passage for a duration until the predicted risk of condensation at the underbody catalyst has been lowered, and responsive to exhaust temperature being higher than an upper threshold, flowing the exhaust through the bypass passage for a duration until the temperature of the exhaust has been lowered below the upper threshold. In any or all of the preceding examples, additionally or optionally, the selectively flowing further includes: responsive to one of the exhaust temperature being higher than the lower threshold, the exhaust temperature being lower than the upper threshold, and the predicted risk of condensation being lowered, transitioning to flowing exhaust through the catalyst in the main exhaust passage via the valve. In any or all of the preceding examples, additionally or optionally, the selectively flowing is further based on cylinder air mass, the selectively flowing including flowing exhaust through the exhaust catalyst, when the cylinder air mass is higher than a threshold mass. In any or all of the preceding examples, additionally or optionally, the engine non-fueling conditions include a deceleration fuel shut-off condition, wherein the engine fueling conditions when exhaust temperature is lower than the threshold include an engine cold-start, and wherein the engine fueling conditions when exhaust temperature is higher than the threshold include an engine hot-start. In any or all of the preceding examples, additionally or optionally, the underbody exhaust catalyst is positioned in the main exhaust passage downstream of a front exhaust catalyst, and wherein the valve is a diverter valve coupled downstream of the underbody catalyst at a junction of the main exhaust passage and the bypass passage. In any or all of the preceding examples, additionally or optionally, flowing exhaust through the main passage includes actuating the diverter valve to a first position where exhaust flow from the bypass passage into the main passage is obstructed, and wherein flowing exhaust through the bypass passage includes actuating the diverter valve to a second position where exhaust flow from the bypass passage into the main passage is not obstructed. In any or all of the preceding examples, additionally or optionally, the bypass passage includes a heat exchanger and wherein flowing exhaust through the bypass passage includes flowing exhaust through the heat exchanger, transferring heat from the flowing exhaust to a coolant circulating through the heat exchanger, and circulating heated coolant through an engine block based on engine temperature and through a heater core based on cabin heating.

Another example method comprises predicting a risk of condensation at an exhaust catalyst based on each of a catalyst temperature and a water content of exhaust gas; and selecting between operating in a first mode with exhaust flowing through the catalyst in a main exhaust passage and operating in a second mode with exhaust flowing through a bypass passage while bypassing the catalyst based on the predicted risk. In the preceding example method, additionally or optionally, the predicted risk is further based on an exhaust air-fuel ratio relative to stoichiometry, the predicted risk increased as a duration of engine operation at leaner than stoichiometry increases. In any or all of the preceding examples, additionally or optionally, exhaust catalyst is an underbody catalyst coupled downstream of a front catalyst in the main exhaust passage, the underbody catalyst having a higher light-off temperature than the front catalyst, wherein exhaust flowing through the catalyst in the main passage includes exhaust flowing from downstream of the front catalyst to an exhaust tailpipe via the underbody catalyst through the main passage, and wherein exhaust flowing through the bypass passage includes exhaust flowing from downstream of the front catalyst to the exhaust tailpipe via the bypass passage, without flowing through the underbody catalyst. Any or all of the preceding examples, further comprises, additionally or optionally, estimating the water content of exhaust gas based on each of an EGR level of the engine, an engine temperature, and an ambient humidity, wherein the predicting includes: increasing the predicted risk as one or more of the catalyst temperature decreases, the EGR level of the engine increases, the engine temperature decreases, and the ambient humidity increases, and decreasing the predicted risk as one or more of the catalyst temperature increases, the EGR level of the engine decreases, the engine temperature increases, and the ambient humidity decreases. In any or all of the preceding examples, additionally or optionally, the selecting includes: operating in the second mode responsive to the predicted risk being higher than a threshold and transitioning to the first mode responsive to the predicted risk being lower than the threshold. In any or all of the preceding examples, additionally or optionally, the selecting includes: selecting the second mode responsive to one of exhaust temperature being lower than a lower threshold, exhaust temperature being higher than an upper threshold, and exhaust oxygen concentration being higher than a threshold concentration; and selecting the first mode responsive to one of the exhaust temperature being lower than the lower threshold or higher than the upper threshold, and exhaust oxygen concentration being lower than the threshold concentration. In any or all of the preceding examples, additionally or optionally, transitioning from operating in the first mode to operating in the second mode in response to a deceleration fuel shut-off event, and transitioning from operating in the second mode to operating in the first mode in response to one of exhaust temperature exceeding an upper threshold and cylinder air mass exceeding a threshold air mass.

In yet another example, an engine system comprises an engine intake manifold including each of a mass airflow (MAF) sensor and a manifold pressure (MAP) sensor; an engine exhaust manifold including a main exhaust passage housing a front catalyst upstream of an underbody catalyst, and a bypass passage coupled to the main exhaust passage from downstream of the front catalyst to downstream of the underbody catalyst, the bypass passage including a heat exchanger; a coolant system fluidically coupling the heat exchanger to a heater core; a diverter valve coupled downstream of the underbody catalyst at a junction of the main exhaust passage and the bypass passage; an exhaust temperature sensor; an exhaust oxygen sensor; and a controller with computer readable instructions stored on non-transitory memory for: responsive to engine operation at leaner than threshold air-fuel ratio, actuating the diverter valve from a first position that enables exhaust flow through the underbody catalyst to a second position that enables exhaust flow through the bypass passage and the heat exchanger, while bypassing the underbody catalyst; estimating a catalyst temperature based on a duration of operation at the threshold air-fuel ratio; in response to the catalyst temperature falling below a threshold temperature while a water content of the exhaust is lower, transitioning the diverter valve to the first position earlier; and in response to the catalyst temperature falling below a threshold temperature while a water content of the exhaust is higher, transitioning the diverter valve to the first position later. In the preceding example method, additionally or optionally, the controller includes further instructions for: based on input from the exhaust temperature sensor indicative of exhaust temperature being above a lower threshold and below an upper threshold, actuating the diverter valve to the first position; based on input from the exhaust temperature sensor indicative of a lower than lower threshold exhaust temperature or a higher than higher threshold exhaust temperature, actuating the diverter valve from the first position to the second position to flow exhaust via the front catalyst, then the bypass passage, and then the heat exchanger; maintaining the diverter valve at the second position for a period based on the water content of the exhaust; and after the period has elapsed, actuating the diverter valve to the first position to flow exhaust via the front catalyst and then the underbody catalyst in the main exhaust passage. In any or all of the preceding examples, additionally or optionally, the controller includes further instructions for: inferring cylinder air flow mass based on input from one of the MAF and the MAP sensor; and in response to a higher than threshold cylinder mass flow, while the water content is lower, actuating the diverter valve to the first position to flow exhaust via the underbody catalyst in the main exhaust passage. In any or all of the preceding examples, additionally or optionally, the controller includes further instructions for: during exhaust flow through the heat exchanger in the bypass passage, transferring heat from the exhaust gas to coolant circulating through the heat exchanger; responsive to an engine heating demand, circulating heated coolant through an engine block; and responsive to a cabin heating demand, circulating heated coolant through the heater core. In this way, by routing exhaust flow to bypass an exhaust underbody catalyst during conditions when there is a higher than threshold risk of condensate formation at the exhaust underbody catalyst, undesired catalyst cooling is reduced. By also flowing exhaust through the bypass passage during engine non-fueling conditions, oxygen saturation and consequent deterioration in catalyst functionality may be reduced. The technical effect of bypassing the underbody catalyst during conditions when the exhaust temperature (higher than an upper threshold, or lower than a lower threshold) is outside a desirable temperature range is that the underbody catalyst temperature may be maintained in an optimal range. By using a heat exchanger in the bypass passage to recover heat from the exhaust, exhaust heat may be effectively used for expedited engine warm-up and for providing heat to the passenger cabin, thereby reducing the parasitic losses of engine power. Overall, by regulating exhaust flow via an underbody catalyst, and a bypass passage housing a heat exchanger, emissions quality may be improved, and engine efficiency may be increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine, comprising:
   during engine non-fueling conditions sensed by a sensor, flowing exhaust through a bypass passage with a heat exchanger while bypassing around an exhaust underbody catalyst positioned in a main exhaust passage, via a valve positioned downstream of the catalyst and actuated by a controller responsive to the sensor; and
   during engine fueling conditions, selectively flowing exhaust through the bypass passage based on each of a temperature and a water content of the exhaust.

2. The method of claim 1, further comprising estimating the water content of the exhaust based on each of an ambient humidity, an exhaust air-fuel ratio, and an EGR level of the engine.

3. The method of claim 2, further comprising predicting a risk of condensation at the underbody catalyst based on each of the estimated water content and a brick temperature of the underbody catalyst, the risk increased as the estimated water content increases or as the brick temperature decreases.

4. The method of claim 3, wherein the selectively flowing includes:
   responsive to exhaust temperature being lower than a lower threshold or higher than a higher threshold, flowing the exhaust through the bypass passage for a duration until the water content of the exhaust has been lowered below a threshold content or the brick temperature of the underbody catalyst has been raised above a threshold temperature.

5. The method of claim 4, wherein the selectively flowing includes:
   responsive to exhaust temperature being lower than the lower threshold or higher than the higher threshold, flowing the exhaust through the bypass passage for a duration until the predicted risk of condensation at the underbody catalyst has been lowered; and
   responsive to exhaust temperature being higher than an upper threshold, flowing the exhaust through the bypass passage for a duration until the temperature of the exhaust has been lowered below the upper threshold.

6. The method of claim 5, wherein the selectively flowing further includes:
   responsive to one of the exhaust temperature being higher than the lower threshold, the exhaust temperature being lower than the upper threshold, and the predicted risk of condensation being lowered, transitioning to flowing exhaust through the underbody catalyst in the main exhaust passage via the valve.

7. The method of claim 1, wherein the selectively flowing is further based on cylinder air mass, the selectively flowing including flowing exhaust through the underbody catalyst when the cylinder air mass is higher than a threshold mass.

8. The method of claim 4, wherein the engine non-fueling conditions include a deceleration fuel shut-off condition, wherein the engine fueling conditions when exhaust temperature is lower than the lower threshold include an engine cold-start, and wherein the engine fueling conditions when exhaust temperature is higher than the higher threshold include an engine hot-start.

9. The method of claim 2, wherein the underbody catalyst is positioned in the main exhaust passage downstream of a front exhaust catalyst, and wherein the valve is a diverter valve coupled downstream of the underbody catalyst at a junction of the main exhaust passage and the bypass passage.

10. The method of claim 9, wherein flowing exhaust through the main exhaust passage includes actuating the diverter valve to a first position where exhaust flow from the bypass passage into the main exhaust passage is obstructed, and wherein flowing exhaust through the bypass passage includes actuating the diverter valve to a second position where exhaust flow from the bypass passage into the main exhaust passage is not obstructed.

11. The method of claim 1, wherein the bypass passage includes the heat exchanger, and wherein flowing exhaust through the bypass passage includes flowing exhaust through the heat exchanger, transferring heat from the flowing exhaust to a coolant circulating through the heat exchanger, and circulating heated coolant through an engine block based on engine temperature and through a heater core based on cabin heating.

12. A method for controlling an engine comprising:
predicting a risk of condensation at an exhaust catalyst based on each of a catalyst temperature and a water content of exhaust gas;
selecting, via a valve actuated by a controller, between operating in a first mode with exhaust flowing through the catalyst in a main exhaust passage with the valve actuated to a first position and operating in a second mode with exhaust flowing through a bypass passage while bypassing the catalyst based on the predicted risk of condensation with the valve actuated to a second position; and
estimating the water content of the exhaust gas based on each of an EGR level of the engine, an engine temperature, and an ambient humidity, as determined by at least one sensor, wherein the predicting includes:
increasing the predicted risk of condensation as one or more of the catalyst temperature decreases, the EGR level of the engine increases, the engine temperature decreases, and the ambient humidity increases, and decreasing the predicted risk of condensation as one or more of the catalyst temperature increases, the EGR level of the engine decreases, the engine temperature increases, and the ambient humidity decreases.

13. The method of claim 12, wherein the predicted risk of condensation is further based on an exhaust air-fuel ratio relative to stoichiometry, the predicted risk of condensation increased as a duration of engine operation at leaner than stoichiometry increases.

14. The method of claim 12, wherein the exhaust catalyst is an underbody catalyst coupled downstream of a front catalyst in the main exhaust passage, the underbody catalyst having a higher light-off temperature than a front catalyst, wherein exhaust flowing in the main exhaust passage includes exhaust flowing from downstream of the front catalyst to an exhaust tailpipe via the underbody catalyst through the main exhaust passage, and wherein exhaust flowing through the bypass passage includes exhaust flowing from downstream of the front catalyst to the exhaust tailpipe via the bypass passage, without flowing through the underbody catalyst.

15. The method of claim 12, wherein the selecting includes: operating in the second mode responsive to the predicted risk of condensation being higher than a threshold and transitioning to the first mode responsive to the predicted risk of condensation being lower than the threshold.

16. An engine system, comprising:
an engine intake manifold including each of a mass airflow (MAF) sensor and a manifold pressure (MAP) sensor;
an engine exhaust manifold including a main exhaust passage housing a front catalyst upstream of an underbody catalyst, and a bypass passage coupled to the main exhaust passage from downstream of the front catalyst to downstream of the underbody catalyst, the bypass passage including a heat exchanger;
a coolant system fluidically coupling the heat exchanger to a heater core;
a diverter valve coupled downstream of the underbody catalyst at a junction of the main exhaust passage and the bypass passage;
an exhaust temperature sensor;
an exhaust oxygen sensor; and
a controller with computer readable instructions stored on non-transitory memory for:
responsive to engine operation at leaner than a threshold air-fuel ratio,
actuating the diverter valve from a first position that enables exhaust flow through the underbody catalyst to a second position that enables exhaust flow through the bypass passage and the heat exchanger, while bypassing the underbody catalyst;
estimating a catalyst temperature based on a duration of operation at the threshold air-fuel ratio;
in response to the catalyst temperature falling below a threshold temperature while a water content of exhaust is lower, transitioning the diverter valve to the first position earlier; and
in response to the catalyst temperature falling below the threshold temperature while the water content of the exhaust is higher, transitioning the diverter valve to the first position later.

17. The system of claim 16, wherein the controller includes further instructions for:
based on input from the exhaust temperature sensor indicative of exhaust temperature being above a lower threshold and below an upper threshold, actuating the diverter valve to the first position;
based on input from the exhaust temperature sensor indicative of a lower than lower threshold exhaust temperature or a higher than higher threshold exhaust temperature, actuating the diverter valve from the first position to the second position to flow exhaust via the front catalyst, then the bypass passage, and then the heat exchanger; maintaining the diverter valve at the second position for a period based on the water content of the exhaust; and after the period has elapsed, actuating the diverter valve to the first position to flow exhaust via the front catalyst and then the underbody catalyst in the main exhaust passage.

18. The system of claim 16, wherein the controller includes further instructions for:
inferring cylinder air flow mass based on input from one of the MAF and MAP sensors; and in response to a higher than threshold cylinder mass flow, while the water content of the exhaust is lower, actuating the diverter valve to the first position to flow exhaust via the underbody catalyst in the main exhaust passage.

19. The system of claim 16, wherein the controller includes further instructions for:
during exhaust flow through the heat exchanger in the bypass passage, transferring heat from the exhaust to coolant circulating through the heat exchanger;
responsive to an engine heating demand, circulating heated coolant through an engine block; and
responsive to a cabin heating demand, circulating heated coolant through the heater core.

* * * * *